United States Patent
Rabb et al.

[11] Patent Number: 6,124,938
[45] Date of Patent: Sep. 26, 2000

[54] SUBMITTING SOFTWARE UPGRADES TO A DIGITAL PRINTER THROUGH A STANDARD PORT

[75] Inventors: Khalid M. Rabb; Thomas G. Beaman, both of Fairport, N.Y.

[73] Assignee: Xerox Corporation, Stamford, Conn.

[21] Appl. No.: 09/160,643

[22] Filed: Sep. 24, 1998

[51] Int. Cl.[7] .................................................. G06F 15/00
[52] U.S. Cl. ........................................ 358/1.15; 358/1.13
[58] Field of Search ................................ 358/1.15, 1.16, 358/1.17, 1.13, 1.14, 1.1, 468, 442, 407, 1.18, 1.2, 1.6, 1.9, 1.11; 710/14, 15, 16, 17, 18, 19, 62, 72, 64, 65, 2, 3, 5, 8

[56] References Cited

U.S. PATENT DOCUMENTS

| | | | |
|---|---|---|---|
| 5,185,853 | 2/1993 | Cheng et al. | 358/1.16 |
| 5,428,714 | 6/1995 | Yawata et al. | 395/112 |
| 5,507,003 | 4/1996 | Pipkins | 347/1.15 |
| 5,532,844 | 7/1996 | Kagami et al. | 358/468 |
| 5,598,533 | 1/1997 | Yokota et al. | 395/200.08 |
| 5,630,029 | 5/1997 | Kosukegawa | 358/1.15 |
| 5,680,596 | 10/1997 | Iizuka et al. | 358/1.15 |
| 5,704,023 | 12/1997 | Kim | 358/1.14 |
| 5,978,560 | 11/1999 | Tan et al. | 358/1.15 |

FOREIGN PATENT DOCUMENTS 0 501 489 A1   9/1992   European Pat. Off. .

*Primary Examiner*—Dov Popovici
*Attorney, Agent, or Firm*—R. Hutter

[57] ABSTRACT

A system for submitting upgrades to software which operates a digital printer. The software enters the printer through a standard printer port. When an upgrade is sent, the status pins are reassigned new functions relating to the progress of the software upgrade, instead of using the status pins of the printer port in a standard fashion for submitting print data. In upgrade mode, the levels of the status pins are recognized as a multi-bit word, relating to a specific condition of the upgrade.

20 Claims, 1 Drawing Sheet

SUBMITTING SOFTWARE UPGRADES TO A DIGITAL PRINTER THROUGH A STANDARD PORT

FIELD OF THE INVENTION

The present invention relates to an arrangement of data flows through a port, such as a "Centronics" parallel port used in printers, for submitting software upgrades to a machine.

BACKGROUND OF THE INVENTION

With the increasing sophistication of office equipment, such as digital copiers, printers, facsimiles, as well as devices which combine many of these functions, individual devices become more and more software intensive. Much of the functionality associated with a particular device dwells in the software of the device, and functionalities of a device can be improved or increased by a software upgrade. Preferably, such software upgrades could be performed by direct installation of new software into a memory within the device. This software installation could be performed, for example, by a tech rep attending the device and plugging in a personal computer or laptop into the device for direct downloading of software; or, the software could be installed in a device remotely, over a network.

Generally, with digital office equipment, the mechanical interfaces between machines and between a device on a network should be of one of a relatively small number of standard designs. The most common design for digital printers is known as the "Centronics" port, which is a type of parallel port having a certain number of pins. When a Centronics port is used to convey data to be printed from a computer to a digital printer, the pins in the port are each given specific functions. For instance, in one typical arrangement, eight pins of the port are dedicated to conveying 8-bit parallel image-related data from the computer to the printer; simultaneously, four pins on the same port are used to convey status information from the printer back to the computer. In a standard design, each of these four pins has a single specific function which is independent of the functions of the other three "status" pins. A typical set of "status bits" used in a standard Centronics interface would include an "out of paper" bit, a "printer not ready" bit, and a "printer error" bit. Whether any of these particular states of the printer was detected by the computer would depend on whether any individual one of these status bits happened to be high.

It is an object of the present invention to provide a system whereby the three standard status lines in a Centronics interface can be expanded to increase the number of possible status messages from a printer to a computer, and thus allow a relatively complicated procedure, such as a software upgrade, to be performed via a standard printer interface port.

DESCRIPTION OF THE PRIOR ART

U.S. Pat. No. 5,428,714 discloses a system in which a computer is connected to a printer via a standard parallel interface. A detector is associated with each paper source in the printer to sense a paper empty or out condition. The printer has an addressable latch that enables a choice of one or more of these detectors for connection through the single status line within the parallel printer interface. The computer accesses the addressable latch prior to any printing so that the presence of an appropriate type of paper in its appropriate print position can be checked.

U.S. Pat. No. 5,532,844 discloses an image data transferring system which interfaces an image processor and an image scanner through input and output ports of a common printer connector mounted on the image processor without using a specific dedicated interface. The image processor and image scanner share the signal input and output ports by classifying the ports into an output port block, and image data input port block, and a control port block.

U.S. Pat. No. 5,598,533 discloses an electronic apparatus including a personal computer and a facsimile. The apparatus includes a group of ports and a common memory which are provided between the computer and the facsimile and are used to transmit and receive various data. An interruption signal generator generates an interruption signal to the reception side of the apparatus when data is supplied between the computer and the facsimile through the ports. An interruption processing program is started when the interruption signal is received.

SUMMARY OF THE INVENTION

According to one aspect of the present invention, there is provided a method of sending software for operating a digital printing apparatus from a computer to a digital printing apparatus. A printer port is provided between the computer and the digital printing apparatus, the printer port having a plurality of data lines for submission of data therethrough and a plurality of status lines. In a first mode, software for operating the digital printing apparatus is sent through the data lines. One status, of a plurality of possible statuses, of sending the software for operating the digital printing apparatus through the data lines is determined, and the determined status is converted to a multi-bit word symbolic of the status, each possible status being symbolized by a unique multi-bit word. The multi-bit word is sent through the status lines in parallel fashion.

According to another aspect of the present invention, there is provided a digital printing apparatus, comprising a printer port having a plurality of data lines for submission of data therethrough, and a plurality of status lines. Means are provided for determining one status, of a plurality of possible statuses of receiving software for operating the digital printing apparatus through the data lines. Means are further provided for converting the determined status to a multi-bit word symbolic of the status, each possible status being symbolized by a unique multi-bit word.

DETAILED DESCRIPTION OF THE INVENTION

Figure 1:
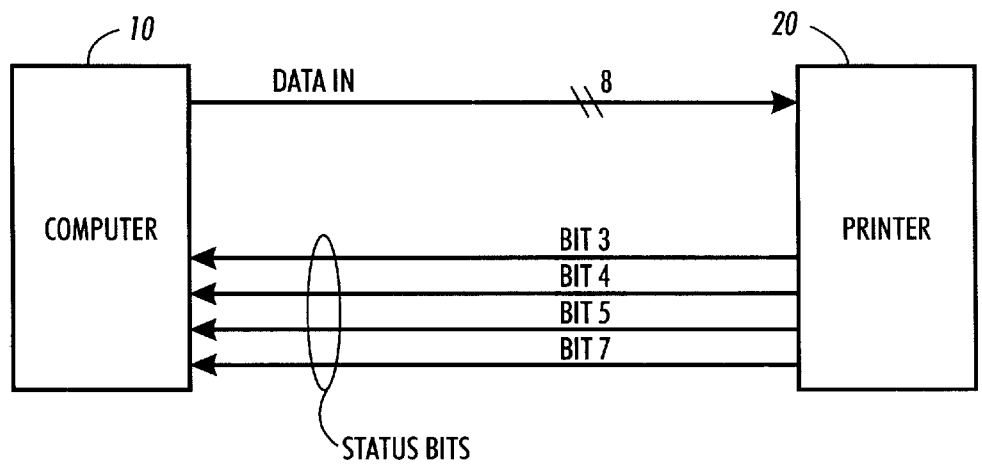
FIG. 1 is a simplified diagram showing the arrangement of a port for conveying data between a computer and machine software.

FIG. 1 is a simplified diagram showing the arrangement of a port for conveying data between a computer 10 and a machine 20 having machine software. As used herein, the phrase "machine software" can mean software in any way operative of a device such as, but not limited to, a copier, printer, facsimile, scanner, or other multi-function device. For present purposes, in the following discussion it will be assumed that the machine 20 being controlled by machine software is a digital printer.

The computer 10 acts as a source of data for the machine software, and can also be used to send image data to the printer, that is, image in a pretdetermined format which is used by the printer to output a desired image. For the immediate purposes of describing the present invention, this data to be conveyed from computer 10 will be in the form of a software upgrade for the machine 20.

The "port" operatively connecting computer 10 with machine software comprises, in this particular embodiment, eight parallel lines forming a DATA IN bus, as shown, and further four "status bits" forming a parallel bus. As shown in the Figure, the status bits are here indicated as BIT 3, BIT 4, BIT 5, and BIT 7. The arrangement shown in the Figure thus represents a simple version of a standard parallel port, such as a Centronics parallel port, which in standard practice is largely a unidirectional port: input data from the computer 10 passes through the eight parallel DATA IN lines, while each individual status bit is assigned a meaning independent of the meaning of any other status bit. For example, in one possible embodiment according to the prior art, BIT 3, depending on whether it is high or low at a given moment, indicates "out of paper," BIT 4 indicates "printer not ready," and BIT 5 indicates some unspecified "printer error." Significantly, in the prior-art arrangement, each status bit conveys a message from the machine software 20 to the computer which is binary and further is independent of the status of any other status line.

As shown in the Figure, a port comprising the data lines and status bits is used for transferring a software upgrade to the printer 20; the same port can be used for both software upgrades and transference of image data when the machine software is printing data from the computer. However, it is also possible to have separate ports for image data transfer and software upgrades.

According to the present invention, the status bits, as shown, which in the standard Centronics port function independently from each other, operate collectively. Instead of assigning each individual status line a specific and independent meaning as in the prior art, a plurality of such status lines can be understood collectively by the computer 10.

Figure 2:
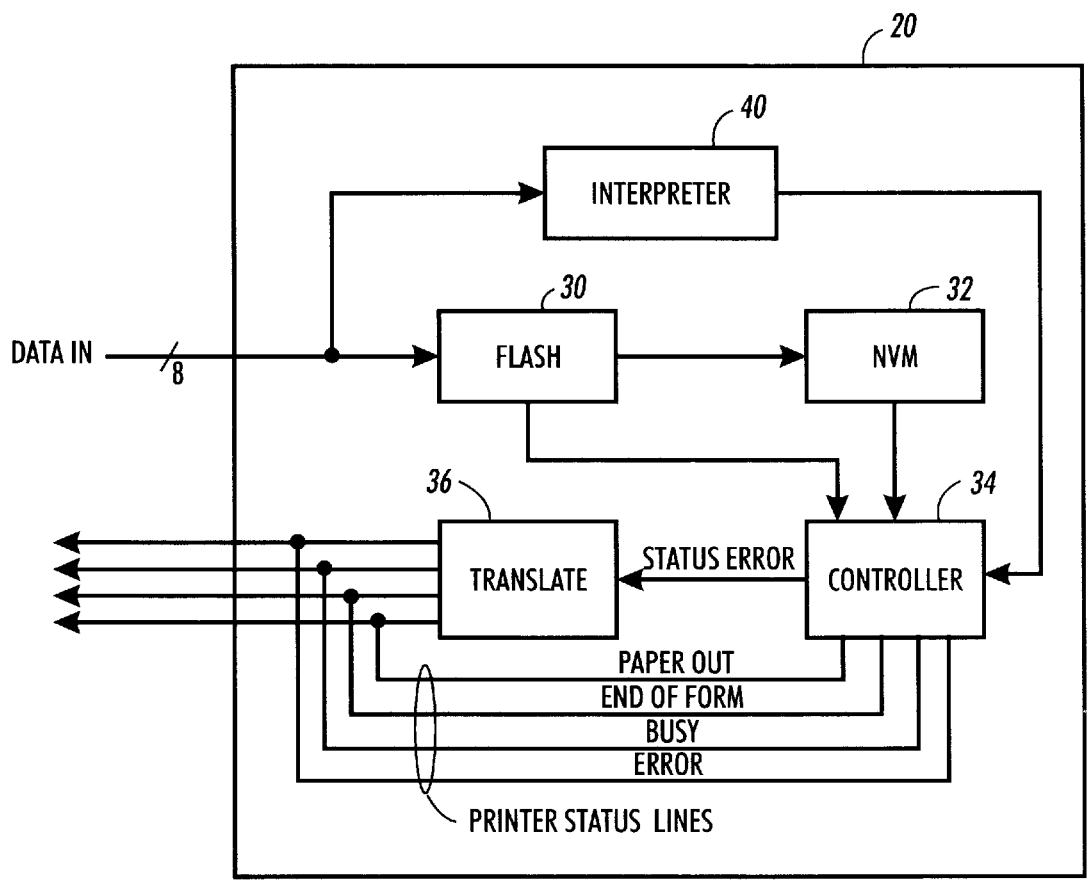
FIG. 2 is a diagram showing one arrangement of a machine wherein a software upgrade may be performed according to the present invention.

To take a practical example of how the status bits from the machine software passing through a standardized port can operate collectively, FIG. 2 shows an example of a basic configuration of memories and control systems associated with machine 20. The eight parallel lines of DATA IN enter a flash memory 30 during a software upgrade. At certain points during a software upgrade, data entered into flash memory 30 is transferred to a non-volatile memory (NVM) 32. The transfer of data from flash memory 30 to NVM 32 is generally controlled by what is here simply called a control program 34. Significantly, part of the control program 34 will, as is common in the art, be capable of outputting specific error or status messages in transferring the software upgrade from the DATA IN lines ultimately to NVM 32. According to the present invention, these error and status messages are sent to a translation table 36, which converts the error or status message to a 3- or 4-bit binary number which has been assigned a specific meaning understandable by the computer 10.

Thus, according to the present invention, instead of having three status lines each with an independent function, there is thus sent to the computer 10 a 3-bit word. As a 3-bit word can have eight different states (from 000 to 111), the opportunity exists for eight distinct error or status messages to be conveyed from machine software 20 to computer 10 through the standard Centronics interface. (In the specific embodiment disclosed, one Centronics status line is retained with its customary function, so that although four lines are shown in the Figures, only three are operated in accordance with the invention.) Each of the eight possible words can be symbolic of one status of the software upgrade.

In addition to assigning meanings to the 3-bit words which the three status bits are capable of sending to the computer 10, it is further possible to assign a specific meaning to the fact that a particular bit is "toggling," or in other words altering its state from high to low and back at a particular rate. In effect, the fact a particular status bit is toggling can be interpreted by the computer 10 as a third state, in addition to high or low, of a particular status bit.

The following discussion is simply a demonstration of one possible arrangement of the interpretation of states of the status bits for a software upgrade from a computer 10 to machine software 20.

To indicate readiness for a file transfer BIT 5=low, BIT 7=high; during the file transfer, BIT 4 toggles.

When the flash memory is being erased, BIT 5=high, BIT 4 toggles.

When the flash memory is being written to BIT 5 is low, while BIT 4 toggles.

When data is transferred to NVM, BIT 5=high, BIT 4 toggles.

When all done, BITs 3, 4, 5 and 7 are high.

If there is an error detected by control system 34 during any upgrade, BIT 3 goes high and specific types of errors are assigned following meanings:

| BIT 3 | BIT 4 | BIT 5 | MEANING |
| --- | --- | --- | --- |
| 1 | 0 | 0 | ckSumError |
| 1 | 0 | 1 | remoteXferFail |
| 1 | 1 | 0 | flashFail |
| 1 | 1 | 1 | upgd complete |

It will be apparent that the assigning of specific meanings to the specific 3-bit words created on BITs 3, 4, and 5 are manifest in the selection of meanings to the 3-bit words in the translation table 36. Of course, the translation table 36 need not be a separate software element within a control system 34, but could be represented by discrete lines within the program of control system 34.

The present invention also facilitates using the identical port both for standard data transfer to a printer (in which case, the status lines would assume their customary Centronics roles), and, in a separate mode, for software upgrade (when the status lines would assume functions according to the software upgrade status). As shown in FIG. 2, there is further provided within printer 20 an "interpreter" indicated as 40 which accepts data through the DATA IN line which also goes to flash memory 30. The interpreter 40 is of a standard design for printers known in the art, such as a PostScript™ or PCL interpreter: that is, when the printer is in a printing mode, the interpreter 40 takes data conveyed to the printer in a standard printer format or page description language and converts the image data to a form directly operative of the printer hardware (not shown). As mentioned above, an interpreter such as 40, which forms the software "heart" of any digital printer, communicates back to the computer 10 (which, at this time, is sending image data to be printed) through the standard Centronics lines, wherein each status line has an independent function such as paper out, end of form, busy, error. These printer status levels, which would appear on the status lines, are shown in FIG. 2 as emerging from controller 34, though of course the particular implementation will depend on a particular printer design.

According to the illustrated embodiment, the same 8-bit parallel data lines used for the software upgrade to flash memory 30 is also used to submit image data to interpreter 40; and the status lines emerging from translation table 36 are used for the standard printer status lines. It is significant to note that, during the software upgrade mode, the levels on the status lines send data which is interpreted as a 3-bit word; but when the printer is in a mode for accepting image data, each status line is assigned an independent meaning, as shown.

In this way, a single port interfacing a digital printing apparatus (or equivalent digital device, such as a digital copier, facsimile, etc.) to a computer or network can be used both for accepting image data in a standard manner, and then, as needed, converting its function to be able accept a software upgrade for the digital printer. Because the software upgrade mode requires a higher level of detail in conveying a status back to the computer, in this software upgrade mode, the status lines are organized to submit to the computer a multi-bit word symbolic of a particular upgrade status, as opposed to the independent status lines which are used in a standard printer mode. Because the states on the three lines at a given time form a 3-bit word, the three lines do not act independently, as they do in the standard Centronics port.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method of sending software for operating a digital printing apparatus from a computer to the digital printing apparatus, comprising the steps of:

providing a printer port between the computer and the digital printing apparatus, said printer port having a plurality of data lines for submission of data therethrough, and a plurality of status lines;

in a first mode, (a) sending the software for operating the digital printing apparatus through the data lines;

(b) determining one status, of plurality of possible statuses, of sending the software for operating the digital printing apparatus through the data lines;

(c) converting the determined status to a multi-bit word symbolic of the status, each possible status being symbolized by a unique multi-bit word; and (d) sending the multi-bit word through the status lines in parallel fashion; and in a second mode, sending data relating to an image to be printed with the printing apparatus through the data lines, where levels on the status lines are not interpreted as a multi-bit word.

2. The method of claim 1, wherein, for at least one status, a toggling on at least one status line is assigned a symbolic meaning within the multi-bit word.

3. A digital printing apparatus, comprising:

a printer port having at least one data line for submission of data therethrough, and a plurality of status lines;

means for operating the printer port in a first mode, wherein a software upgrade for the printing apparatus is accepted by the printing apparatus through the data line while a status of accepting the software upgrade is communicated as a multi-bit word in parallel through the status lines; and means for operating the printer port in a second mode, wherein image data to be output by the printing apparatus is accepted by the printing apparatus through the data line while simultaneously levels on the status lines are not interpreted as a multi-bit word.

4. The digital printing apparatus of claim 3, wherein a toggling on at least one status line is assigned a symbolic meaning within the multi-bit word.

5. The digital printing apparatus of claim 3, wherein, in the second mode, the status lines assume Centronics roles for data transfer.

6. The digital printing apparatus of claim 3, wherein one multi-bit word indicates a failure of a flash memory in the printing apparatus.

7. The digital printing apparatus of claim 3, wherein one multi-bit word indicates that a software upgrade is complete.

8. The digital printing apparatus of claim 3, wherein one multi-bit word indicates that the printing apparatus is ready for a file transfer.

9. The digital printing apparatus of claim 3, wherein one multi-bit word indicates that a flash memory in the printing apparatus is being erased.

10. The digital printing apparatus of claim 3, wherein one multi-bit word indicates that a flash memory in the printing apparatus is being written to.

11. The digital printing apparatus of claim 3, wherein one multi-bit word indicates that data is being transferred to a non-volatile memory in the printing apparatus.

12. A method of operating a digital printing apparatus, comprising the steps of:

providing a printer port having at least one data line for submission of data therethrough, and a plurality of status lines;

operating the printer port in a first mode, wherein a software upgrade for the printing apparatus is accepted by the printing apparatus through the data line while simultaneously a status of accepting the software upgrade is communicated as a multi-bit word in parallel through the status lines; and operating the printer port in a second mode, wherein image data to be output by the printing apparatus is accepted by the printing apparatus through the data line while simultaneously levels on the status lines are not interpreted as a multi-bit word.

13. The method of claim 12, wherein a toggling on at least one status line is assigned a symbolic meaning within the multi-bit word.

14. The method of claim 12, wherein, in the second mode, the status lines assume Centronics roles for data transfer.

15. The method of claim 12, wherein one multi-bit word indicates a failure of a flash memory in the printing apparatus.

16. The method of claim 12, wherein one multi-bit word indicates that the software upgrade is complete.

17. The method of claim 12, wherein one multi-bit word indicates that the printing apparatus is ready for a file transfer.

18. The method of claim 12, wherein one multi-bit word indicates that a flash memory in the printing apparatus is being erased.

19. The method of claim 12, wherein one a multi-bit word indicates that a flash memory in the printing apparatus is being written to.

20. The method of claim 12, wherein one multi-bit word indicates that data is being transferred to a non-volatile memory in the printing apparatus.

* * * * *